Oct. 12, 1937.                J. R. GIER, JR                    2,095,807
                    FUSION WELDING OR BRAZING OF METALS
                              Filed June 26, 1935
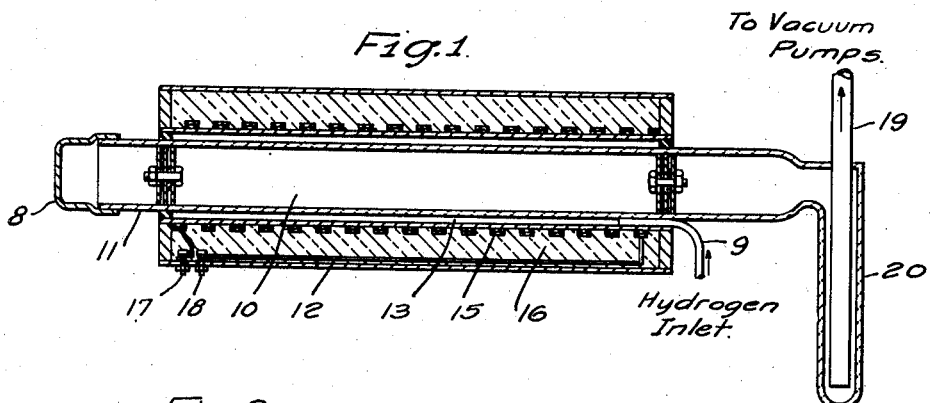
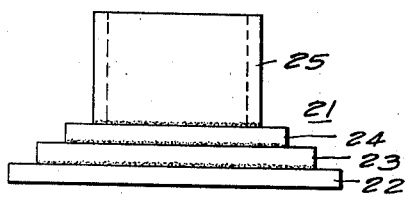
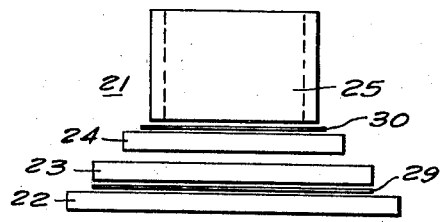
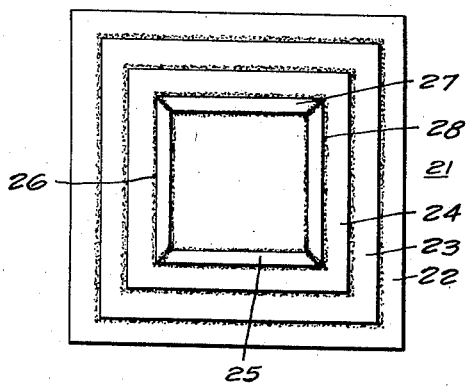
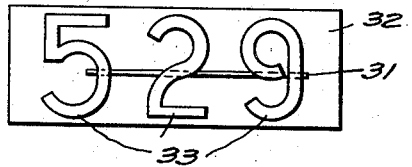
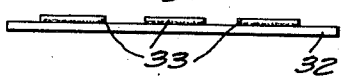
WITNESSES:                                        INVENTOR
                                                John R. Gier Jr.
                                              BY
                                                    ATTORNEY Patented Oct. 12, 1937

2,095,807

UNITED STATES PATENT OFFICE 2,095,807

FUSION WELDING OR BRAZING OF METALS

John R. Gier, Jr., Wilkinsburg, Pa., assignor to Westinghouse Electric & Manufacturing Company, East Pittsburgh, Pa., a corporation of Pennsylvania Application June 26, 1935, Serial No. 28,494

5 Claims. (Cl. 113—112)

This invention relates to the fusion welding or brazing together of metals.

In the methods practiced heretofore, it has been found to be practically impossible to produce a satisfactory fusion welding or brazing of metals containing refractory oxides.

The refractory oxides of the chromium alloys and other alloys containing titanium or silicon are quite difficult to reduce and where such metals are welded or brazed, it is found that the bonds produced usually contain some of the porous oxides and the resulting joint will be porous. Further in practicing old methods, it is found that a definite amount of the solder metal does not fuse with the metals being welded, but instead remains in the pure state and will amalgamate with mercury.

An object of this invention is to provide for the fusion welding or brazing together of metals.

Another object of this invention is to provide for the fusion welding or brazing together, in a purified reducing atmosphere, metals having refractory oxides.

According to this invention, the metals having refractory oxides are welded or brazed together in a blanket of purified reducing gas at a low atmospheric pressure so that the oxides of the metals are first reduced and the cleansed metallic surfaces are maintained in a chemically clean state while the brazing or welding is being effected.

This invention may be better understood from the following description when taken in conjunction with the accompanying drawing, in which Figure 1 is a cross sectional vertical view of a welding furnace in which the reducing gas is purified and the welding or brazing is effected, Fig. 2 is a front elevational view of an article which has been welded in accordance with this invention, Fig. 3 is an exploded elevational view of the article shown in Fig. 2 before the article has been welded and showing the relation of the solder metal to the different portions of the article, Fig. 4 is a top plan view of the article shown in Fig. 2, Fig. 5 is a top plan view of another article showing the relation of the solder metal to the metals being welded in accordance with this invention, and Fig. 6 is a front elevational view of the article shown in Fig. 5 which has been welded in accordance with this invention.

In practice, the metallic articles to be welded are so fabricated that when assembled, the abutting members are tightly engaged. The solder metal, which is preferably copper but may be some other suitable material such as a copper silver alloy, is placed near or in the joint between the parent metals and the assembled pieces are then introduced into the welding furnace.

As shown in Fig. 1 of the drawing, the furnace comprises a welding chamber 10 formed by a tube or envelope 11 supported in a metallic jacket 12. The tube 11 is made from some suitable material which is capable of filtering a reducing gas to purify it. Satisfactory tubes may be made from vitreous materials, for example, silica, sillimanite or porcelain.

An annular chamber 13 is provided around the tube 11 for receiving the reducing gas. The reducing gas is supplied to the annular chamber 13 from a suitable source of supply such as a tank of compressed gas through an inlet pipe 9.

In order to provide the necessary heat during the welding of the article, heating elements 15 are positioned around the annular chamber 13. Thermal insulating material 16 is disposed between the metallic jacket 12 and the wall of the chamber 13 to aid in keeping the furnace at the proper temperature during the welding process. The heating elements are connected to a source of power (not shown) by leads 17 and 18.

In order to evacuate the welding chamber 10, an exhaust tube 19 is provided in a liquid air trap 20 at one end of the welding chamber and is connected to a vacuum pump (not shown).

In practice, the metals to be welded are assembled and placed in the welding chamber 10 which is sealed from the surrounding atmosphere by some suitable means, such as a cap 8. After the chamber is sealed, it is evacuated to a pressure of about $1 \times 10^{-4}$ mm. by means of the vacuum pump, while the reducing gas is admitted to the chamber 13. The temperature of the furnace is then raised by means of the heating elements 15 to a welding temperature of between the melting point of the solder metal employed and 1300° C.

While heating the furnace to the welding temperature, the welding chamber is continuously exhausted. As the welding chamber is being evacuated, the reducing gas in the annular chamber 13 diffuses through the hot walls of the tube 11 and envelopes or blankets the articles which are being welded. In this manner reducing gas is continuously supplied to the welding chamber during the welding process.

In passing through the hot walls of the tube 11, the reducing gas is purified to an ultra-pure state, the impurities which are normally present in the gas being filtered from the gas by the tube 11. This is because the hot tube or filter has a greater permeability for the reducing gas than for oxygen, water vapor and other gases. The pure reducing gas is quite active and easily reduces the most stable oxides.

When the temperature of the furnace is raised above the melting point of the solder metal employed, the solder melts and completely wets the surfaces of the metals to be welded and flows into the joints between the different metals where it diffuses into the metals forming an alloy therewith. The furnace is then cooled and the metals are bonded together. It is found that the welded joints are capable of withstanding severe shocks or blows and when employed in making containers are sufficiently tight to enable the drawing of a vacuum. Where the metals are steel or iron, it is found that the alloys formed by the diffusion of the solder through the metals will not amalgamate with mercury.

As stated hereinbefore, the solder metal is placed near or in the joint which is to be welded. However, it is not necessary in this novel method of welding to fill the joint for, as shown in Figs. 3 and 5 of the drawing, advantage may be taken of the fact that the surfaces of the metals being welded are first cleaned by reducing the oxides and that the solder metal completely wets such clean surfaces. In practice, it is found that the refractory oxides may be reduced at temperatures above 800° C. This cleansing may be accomplished as a separate step or in conjunction with the heating of the furnace to the welding temperature.

As shown in Figs. 2, 3, and 4 of the drawing, the article 21 is assembled from a series of metallic plates 22, 23 and 24 stacked in stepped relation and a rectangular wall formed from the plates 25, 26, 27 and 28 positioned on plate 24. The metallic plates are assembled in close fitting relation. As shown in Fig. 3, a thin narrow strip of solder metal 29, preferably copper, is placed between plates 22 and 23 while thin copper wire 30 is wound around the plates 25, 26, 27 and 28 forming the rectangular wall.

When the assembled article is placed in the furnace and is heated to a welding temperature, the copper solder melts and diffuses into the clean contacting surfaces of plates 22 and 23 and because of its wetting action, the copper flows around the edge of plate 23 to the contacting portion of the plates 23 and 24 where the capillary attraction of the joint therebetween causes the copper to flow throughout the joint and to diffuse into the contacting surfaces. Such diffusion thoroughly bonds the metallic plates together since the copper has formed an alloy therewith.

The copper wire 30 around the rectangular wall also melts and flows into the joint between the base of the wall and plate 24 and by capillary attraction flows throughout the vertical joints between the plates 25, 26, 27 and 28. A micro-examination of the joints so formed reveals that no free or pure copper remains in the joints but instead a mercury resistant alloy is formed which firmly bonds the plates together in a vacuum tight joint.

In the article shown in Fig. 5, advantage has been taken of the wetting action of the solder metal which is employed in this novel welding method in that a very thin narrow copper strip 31 is employed in welding the several joints between the metallic surfaces. As shown, the article comprises a metallic plate 32 and the metallic numerals 33 which are to be welded thereon to produce a raised numeral plate. The thin copper strip 31 is placed between the metallic plate 32 and the numerals 33 so that only a small portion of the copper strip is contacting the numerals.

When the article is placed in the welding furnace and the temperature of the furnace is brought to a welding temperature, it is found that the oxides of the surfaces of the metallic plate 32 and the metallic numerals 33 are completely reduced so that the copper thoroughly wets the surfaces and flows into the joints formed between the plate and the numerals where it diffuses into the metal.

The amount of solder which diffuses into the metal depends upon the length of the welding treatment. Complete diffusion of the solder has been found to be effected by a welding treatment ranging from a few minutes to about four hours depending upon the amount of solder employed and the metal which is being welded. Simple mechanical bonds may be effected by heating the metals at the welding temperature for a period of less than a minute.

While this invention has been described with reference to a particular method, it is to be understood that it is not to be limited to the exact details thereof except insofar as is necessitated by the prior art and the scope of the appended claims.

I claim as my invention:

1. The method of fusion welding or brazing of metals having refractory oxides in a furnace having a wall of one of the vitreous materials selected from the group consisting of silica, sillimanite and porcelain comprising, assembling the metal members to be welded, applying solder metal to the metal members, the solder metal being capable of diffusing into the metals of the members, introducing the assembled metal members into the furnace, sealing the furnace, evacuating the furnace, heating the furnace, supplying a reducing gas to the furnace by diffusing it through the heated wall of vitreous material to purify the gas and blanket the metal members, and raising the temperature of the blanketed members in the furnace to a temperature above the melting point of the solder metal to diffuse the solder metal into the members to effect the welding of them.

2. The method of fusion welding or brazing of metals having refractory oxides in a furnace having a wall of one of the vitreous materials selected from the group consisting of silica, sillimanite and porcelain comprising, assembling the metal members to be welded, applying solder metal to the metal members, the solder metal being capable of diffusing into the metals of the members, introducing the assembled metal members into the furnace, sealing the furnace, evacuating the furnace, heating the furnace, supplying a reducing gas to the furnace by diffusing it through the heated wall of vitreous material to purify the gas and blanket the metal members, and raising the temperature of the blanketed members in the furnace to a temperature above the melting point of the solder metal but below 1300° C. to diffuse the solder metal into the members to effect the welding of them.

3. The method of fusion welding or brazing of metals having refractory oxides in a furnace having a wall of one of the vitreous materials selected from the group consisting of silica, sillimanite and porcelain comprising, assembling the metal members to be welded, applying solder metal to the metal members, the solder metal being capable of diffusing into the metals of the members, introducing the assembled metal members into the furnace, sealing the furnace, continuously evacuating the furnace, heating the furnace, supplying a reducing gas to the furnace by continuously diffusing it through the heated wall of vitreous material to purify the gas and blanket the metal members, heating the blanketed members in the furnace at a welding temperature between the melting point of the solder and 1300° C. to diffuse the solder into the members, and cooling the members while maintaining the blanket of purified reducing gas about the members.

4. The method of fusion welding or brazing of metals having refractory oxides in a furnace having a wall of one of the vitreous materials selected from the group consisting of silica, sillimanite and porcelain comprising, assembling the metal members to be welded, applying solder metal to the metal members, the solder metal being capable of diffusing into the metals of the members, introducing the assembled metal members into the furnace, sealing the furnace, continuously evacuating the furnace, heating the furnace to a temperature between 800° C. and the melting point of the solder, supplying a reducing gas through the heated wall of vitreous material to purify the gas and blanket the metal members, raising the temperature of the blanketed members in the furnace to a temperature between the melting point of the solder and 1300° C. to diffuse the solder into the members, and cooling the members in the furnace while maintaining the blanket of purified reducing gas about the members.

5. The method of fusion welding or brazing of metals having refractory oxides in a furnace having walls of vitreous material selected from the group consisting of silica, sillimanite and porcelain which is capable of filtering a reducing gas comprising, assembling the metal members to be welded, applying solder metal to the metal members, the solder being capable of diffusing into the metals of the members, introducing the assembled members into the furnace, sealing the furnace, evacuating the furnace, heating the furnace to a welding temperature between the melting point of the solder and 1300° C., supplying a reducing gas to the furnace by continuously diffusing it through the heated vitreous material of the furnace to purify the gas and blanket the metal members in the furnace, heating the blanketed members at the welding temperature for a time of between four minutes and four hours to diffuse the solder metal into the members, and cooling the members to room temperature while maintaining the blanket of purified reducing gas about the members.

JOHN R. GIER, Jr.